UNITED STATES PATENT OFFICE.

HENRY W. GOULD, OF ST. LOUIS, MISSOURI.

COMPOSITION FOR PAVING, ROOFING, &c.

SPECIFICATION forming part of Letters Patent No. 303,568, dated August 12, 1884.

Application filed April 12, 1884. (No specimens.)

*To all whom it may concern:*

Be it known that I, HENRY W. GOULD, of the city of St. Louis, in the State of Missouri, have invented a certain new and useful Composition for Paving, Roofing, &c., of which the following is a full, clear, and exact description.

This invention consists in the combination of the simple metal lead with sand or gravel, or broken or crushed stone, with or without the addition of cement of any description, to form blocks, plates, or sheets either in position for use or to be formed at other place, and subsequently laid down or placed in position.

The materials may be mixed together in any manner that will cause a thorough mingling of the lead with the other material. For instance, the materials may be placed together in an iron pan above a fire and raised to a temperature sufficiently high to melt the lead, when the materials are thoroughly mixed, and may be at once laid down in position or formed into blocks, plates, or sheets, either with or without pressure. In some cases the lead should be in sufficient quantity to wholly fill the pores or interstices of the mass, while in other cases the lead may form a smaller percentage of the mass, merely forming a coat on the particles of other material, but still serving as a bond to hold them together, owing to ability of particles of lead to weld together even at a low temperature.

In forming the composition for paving I prefer to take gravel or broken stone of good size, say as ordinarily used in forming the surface of macadam or gravel roads. With this may be mixed more or less finer gravel or sand, or both, and sufficient lead to bind the material together. The ingredients should be compounded when at or above the fusing-point of the lead. This pavement should be laid upon a solid substratum constructed in any suitable manner, my composition being intended for the surface.

Where it is desired to make the composition impervious to water, and yet to use the lead in insufficient quantity to wholly fill the interstices of the mass, hydraulic cement should be used in the compound.

Where the compound is made in thin sheets—as for roofing or similar purposes—sand or finer earth would be mixed with the lead, and this composition may be rolled out into long rolls when it is made thin enough to be flexible. Cement may also be used in the composition in this case.

It is claimed for this pavement that it will not be liable to flake off in cold weather, nor to become soft in hot weather, and that it will deaden the sound of the wheels and horses' feet; also that horses will not be liable to slip, because stone will always be exposed at the surface. The pavement will be very permanent in character, because the lead will firmly hold the stone and other material with a bond that will not be loosened by use or changes of temperature, or from any other cause.

I claim as my invention—

1. The described composition for paving and other purposes, consisting of lead and earthy material, substantially as set forth.

2. The described composition of lead, earthy material, and cement, substantially as set forth.

HENRY W. GOULD.

Witnesses:
SAML. KNIGHT,
GEO. H. KNIGHT.